Jan. 7, 1958 R. F. KRUPP ET AL 2,818,987
JAR HANDLING MACHINE
Filed April 11, 1955 4 Sheets-Sheet 1

INVENTORS
ROBERT F. KRUPP
ROBERT C. OLIVER
Townsend, Townsend,
and Hoppe
ATTORNEYS Jan. 7, 1958 R. F. KRUPP ET AL 2,818,987
JAR HANDLING MACHINE
Filed April 11, 1955 4 Sheets-Sheet 2

INVENTORS
ROBERT F. KRUPP
ROBERT C. OLIVER
BY
Townsend, Townsend and Hoppe
ATTORNEYS

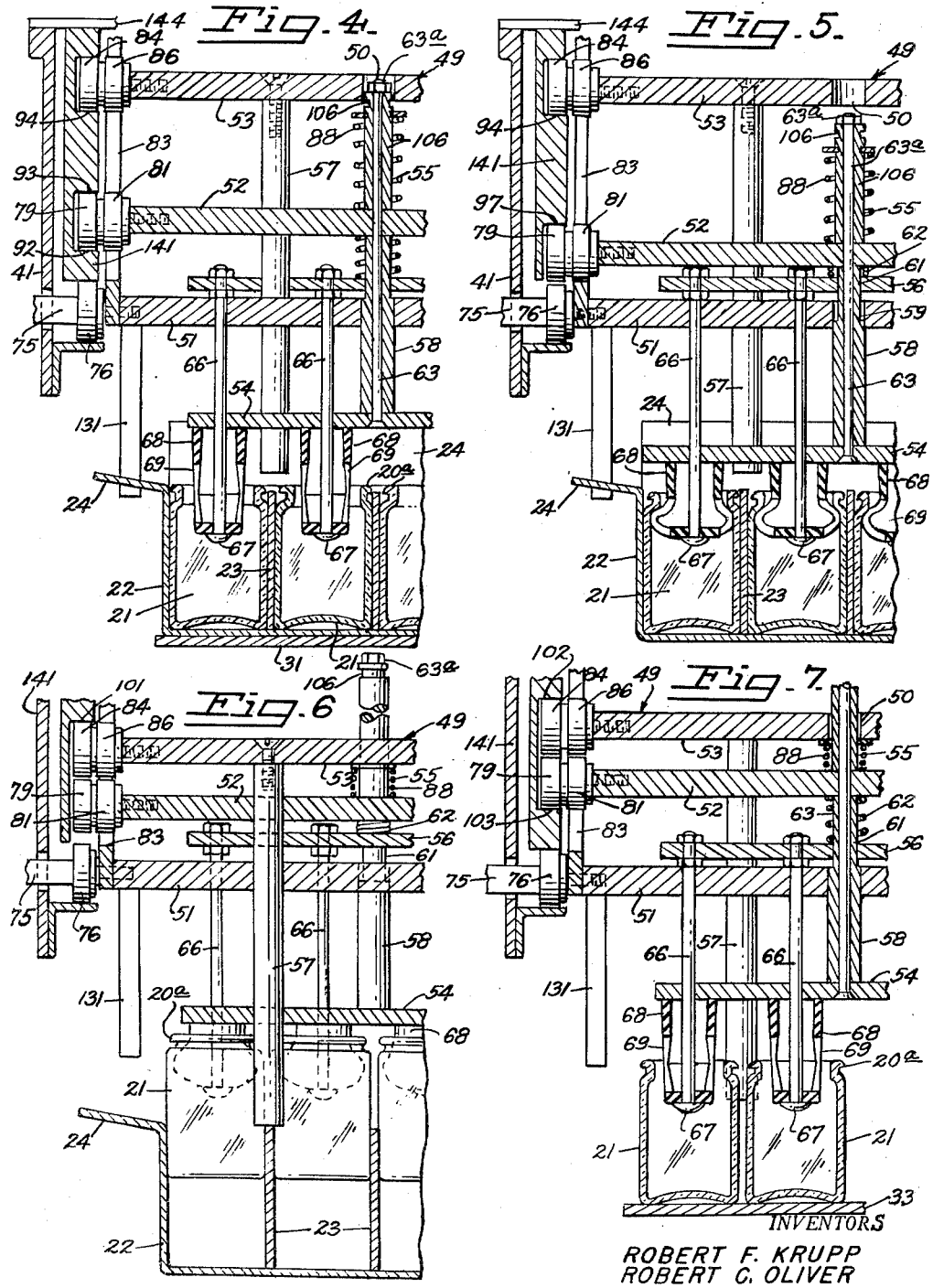

Jan. 7, 1958   R. F. KRUPP ET AL   2,818,987
JAR HANDLING MACHINE
Filed April 11, 1955   4 Sheets-Sheet 4
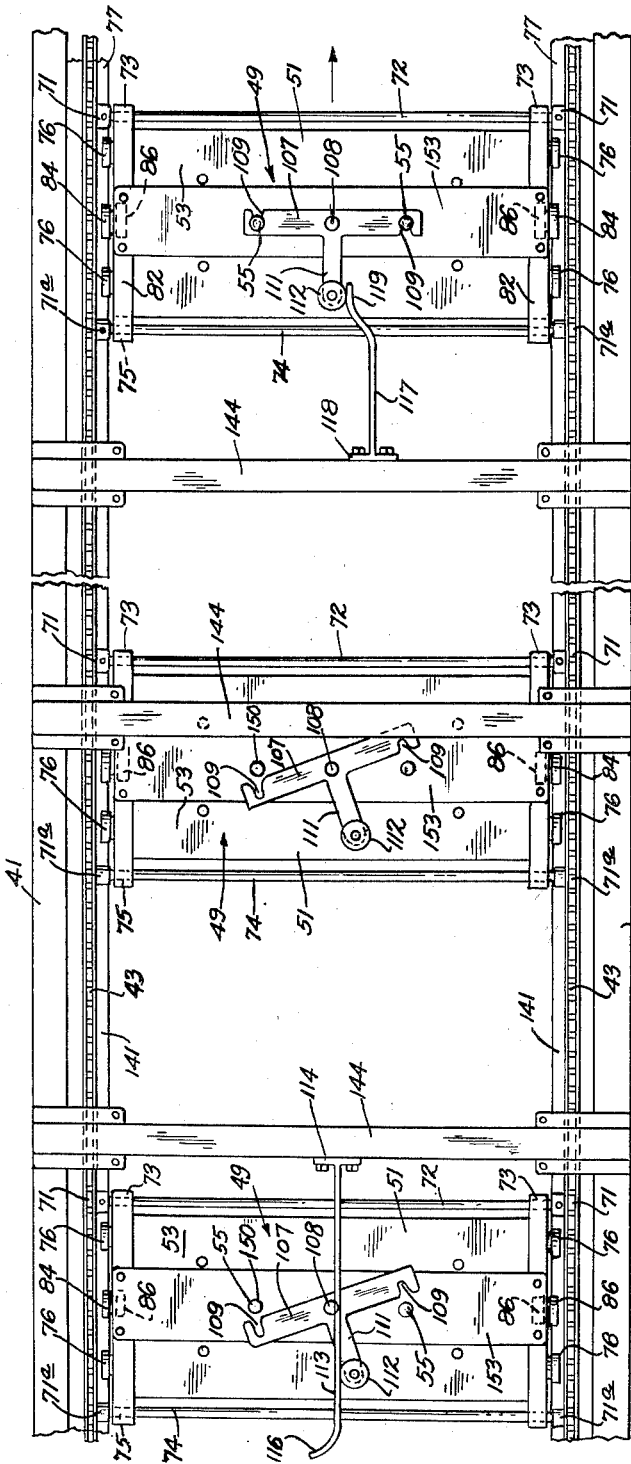
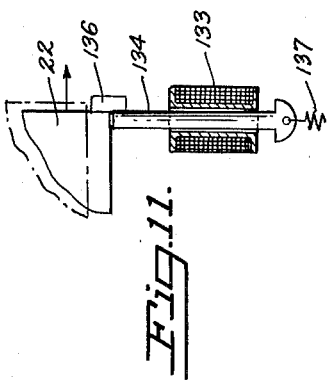
INVENTORS
ROBERT F. KRUPP
ROBERT C. OLIVER
BY
Townsend, Townsend and Hoppe
ATTORNEYS

United States Patent Office 2,818,987
Patented Jan. 7, 1958

2,818,987

JAR HANDLING MACHINE

Robert F. Krupp, San Lorenzo, and Robert C. Oliver, Hayward, Calif., assignors to Gerber Products Company, Fremont, Mich., a corporation of Michigan Application April 11, 1955, Serial No. 500,546

18 Claims. (Cl. 214—309)

This invention relates to a new and improved machine for handling glass jars, bottles, or the like, as in loading or unloading the jars into or from shipping containers. In accordance with conventional practice, empty glass jars suitable for packing foodstuffs and the like are shipped from the glass container factory in corrugated shipping containers or cases in order to protect the containers from damage during transportation. At the factory, the jars are inserted in containers. At the cannery, the jars are removed from the containers, washed, filled, heat processed and then replaced in identical shipping containers for transportation to the retail outlet where they are to be sold. The present invention relates to a machine for removing the jars from the shipping containers and with certain modifications the machine may be employed to insert jars in such containers. It will be understood that with modifications which will be readily understood by those skilled in the art to which this invention pertains, other containers may be handled by the machine hereinafter described.

The primary purpose of the present invention is to remove glass containers or the like from shipping cases rapidly and by mechanical means. One of the principal advantages of the invention is the fact that in the removal of the jars from the cases it is unnecessary to invert the cases. As hereinafter described in detail, the jars are positioned upright in the machine and are gripped in such manner that the containers may be stripped from contact with the jars by pushing them vertically downward.

A further principal advantage of the machine is the fact that the upper edge of the jar is protected from contact with any hard surface. Protection of the "finish" of the sealing lip of the glass jar is of great importance inasmuch as this portion of the jar is most likely to be damaged by handling. Damage to the finish may be a source of breakage during heat processing of the container, leakage of the sealed container may occur through a crack or other blemish in the finish, and injury to the finish is a source of consumers' complaint inasmuch as it may appear to the consumer that glass may have entered into the container and become mixed with the food product therein. As hereinafter described, the only contact with the finish of the glass container is by means of a rubber cup, which is soft and flexible and cannot injure the finish.

Another feature of the invention is the absence of metal contact with the interior of the jar. Any contact of the jar with a metal element is likely to cause injury to the jar and the elimination of such metal contact is of advantage in the construction of this device.

Other objects of the present invention will become apparent upon reading the following specification and referring to the accompanying drawings in which similar characters of reference represent corresponding parts in each of the several views.

In the drawings:

Fig. 4 is a fragmentary vertical sectional view similar to Fig. 2 showing the machine in what is hereinafter referred to as "second position";

Fig. 5 is a view similar to Fig. 4 in "third position";

Fig. 6 is a view similar to Fig. 4 in "fourth position";

Fig. 7 is a view similar to Fig. 4 in "fifth position";

Fig. 8 is a perspective view of a rubber cup used to grip the jars;

Fig. 9 is a fragmentary top plan view partially broken away for space requirements;

Fig. 10 is a perspective view of a modified structure used to handle bottles; and Fig. 11 is a fragmentary schematic top plan view showing the mechanism for feeding packing cases into the machine in proper timed relationship.

Figure 1:
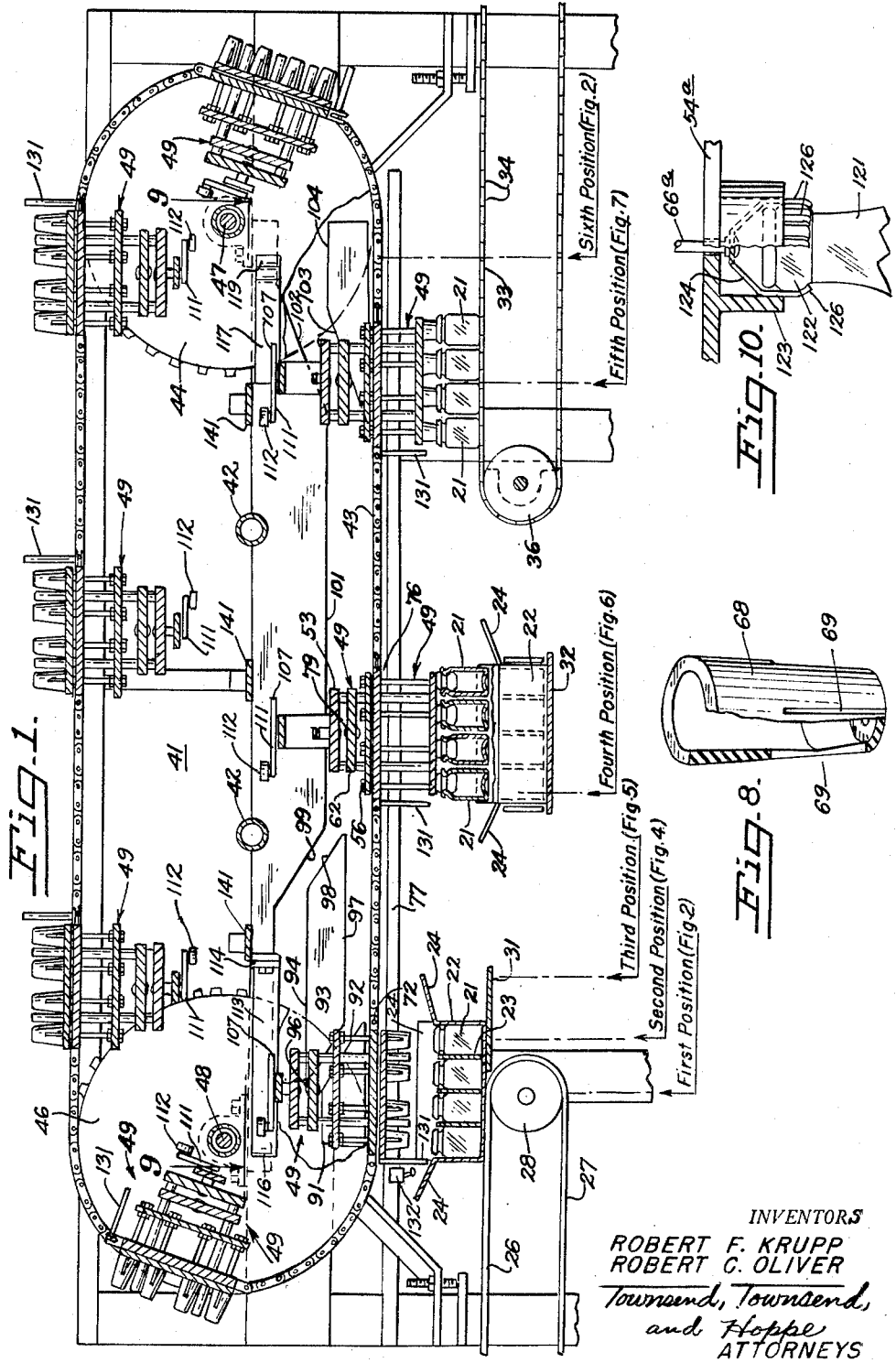
Fig. 1 is a longitudinal vertical sectional view through the machine, partially schematic in certain details of the machine in order to emphasize the cycle of operations thereof.

The containers which are handled in the machine which is the subject of this invention, are conventional glass jars 21, it being understood that with minor changes the machine may be used for other types of containers of the same general open top construction. The upper edge 20a of the jars 21 comprises the "finish" which is protected against damage in accordance with the instant invention. Jars 21 are transported from the factory to the filling station in shipping cases 22, generally of corrugated paper construction. Longitudinal and transverse dividers 23 are interposed between adjacent jars and keep the jars from contacting and damaging each other.

The loaded cases 22 are placed on a belt conveyor 26 driven by pulley 28, whence they are conveyed through flap opening means of a conventional nature. The opened cases with finish 20a uppermost are thus transported to and against stop 136 where they are retained and caused to slide on conveyor 26. Beyond pulley 28 is unloading platform 31 which is co-planar with conveyor 26. An open shipping container when released from stop 136 through action of plunger 134 and solenoid 133 rests partly on the end of conveyor 26 and partly on platform 31 when it is in position for unloading.

Beyond the end of the unloading platform 31 is an empty container belt 32 which moves transversely to the direction of movement of conveyor 26. After the glass jars 21 and the container 22 have been moved away from platform 31, the jars 21 are held in position by the machine hereinafter described and the shipping container 22 and dividers 23 are pushed downwardly until they are free of the jars 21, whereupon they fall upon the belt 32 and are conveyed away and subsequently loaded with filled jars 21.

On the opposite end of the machine is a discharge conveyor 33 which may be of any conventional construction, such as flat links 34 suitably joined together in a manner well understood in the conveyor art. Idler sprocket 36 is suitably positioned so that the platform 31 and upper stretch of the conveyor 33 are substantially at the same level. The jars which have been removed from the shipping container 22 are deposited on the belt 33.

On either side of the jar unloading machine is a vertically disposed side frame 41, the opposed side frames being rigidly connected together by cross-overs 42 which hold the side frames 41 parallel to each other. Mounted on each side of frame 41 is a link chain 43 suspended by drive sprocket 44 and driven sprocket 46, the opposite pairs of sprockets being mounted on shafts 47 and 48, respectively. The linear speed of the chains 43 is equal to that of discharge conveyor 33. A plurality of pallets 49 are mounted for movement with the chains 43. Each pallet 49 comprises five transversely extending, parallel plates which move with the chains 43. The plates are a carrier plate 51 which is connected, by means hereinafter described, to the chains 43 themselves, cup elevating and lowering plate 52, case stripping plate 53, cup compressing plate 54 and stop plate 56. Strip pins 57 are secured to the lower surface of case striping plate 53 and extend through suitable apertures in the other four plates so that the strip pins 57 not only perform the function of stripping off the shipping container (as hereinafter described in detail), but also align the other four plates in their movement during the cycle of operations of the machine. As is shown in the accompanying drawings, the strip pins 57 project beyond the lower surface of the cup compression plate 54 and contact the upper edge of the dividers 23 when shipping case 22 is being stripped from the jars 21.

Connected to the cup elevating and lowering plate 52 is a plurality of sleeve spacers 58. A shoulder 59 is formed on the spacer 58 leaving a neck 61 on the upper end thereof surrounding which is a spring 62. Neck 61 passes through apertures in plate 56 with springs 62 interposed between plates 52 and 56. The lower portions of spacers 58 pass through apertures in plate 51 and the lower end of spacer 58 bears against the upper surface of plate 54. Sleeves 55 are positioned on top of cup-elevating plate 52 and project up through apertures 50 and 150 in plate 53 and 153, respectively. Tie bolts 63 are secured to compression plate 54 and pass through the spacers 58 and sleeves 55 and receive nuts 63a which draw plates 54 and 52 toward each other but spaced a fixed distance apart, which distance is equal to the length of spacers 58.

The foregoing construction insures that, although the distance between plates 52 and 54 is a fixed and invariable distance, the distance between plates 54 and 56 is variable. The pressure of spring 62 tends to maintain plates 54 and 56 at a fixed distance, but upon compression of springs 62 this distance may be varied during the cycle of operation of the machine as hereinafter appears.

Fixed to and projecting downwardly from the plate 56 is a plurality of cup support rods 66 corresponding in number to the number of jars 21 in each case 22 and positioned immediately above the center of each jar 21 when in position in the case 22. Each rod 66 has an enlarged head 67 on its lower end. Pliable rubber cups 68 are interposed between heads 67 and plate 54. A number of longitudinally extending slots 69 are formed in the cups 68, slots 69 extending upwardly from the bottom of cups 68 approximately two-thirds of the length thereof. The construction of the cups 68 is such that with the support rods 66 and head 67 held stationary, downward movement of plate 54 compresses the cups 68 and causes them to bend outwardly. The normal or relaxed diameter of cups 68 is substantially less than the interior diameter of the jars 21 so that the cups may readily be inserted inside the jars. However, upon compression of the cups 68, they swell and grip the interior of the jars 21. The position assumed by the cups in the jars when they are compressed is best shown in Figs. 5 and 6. As is apparent from those figures, the jars are securely gripped by the cups 68 and cannot be dislodged therefrom.

Pallets 49 are moved by the chains 43. For such purpose, adapter links 71 are inserted in the chains 43 at appropriate intervals and transverse carrier bars 72 are attached to opposed links 71. Bars 72 pass through forwardly projecting lugs 73 in the forward edge of the vertically disposed plates 82 which are bolted to and extended upwardly from plate 51 on either side of each pallet. The rear of each of the plates 82 is provided with an inwardly extending slot 74 in which rides transversely extending rod 75, the opposite ends of which are carried by opposed adapter links 71a in chain 43. This construction provides for support of the rearward end of the pallet 49 by chains 43 as the pallet is carried around sprocket 44 or 46 since rod 75 may slide freely in slot 74. Plates 82 are provided with rollers 76 at each end. On the bottom stretch of the machine the rollers 76 rest upon tracks 77. It will be observed that the tracks 77 are horizontal so that the carrier plate 51 maintains a horizontal path of travel during the operative position of the pallet.

Plate 52 is provided with a pair of rollers 79 and 81 on each side of the machine. Outer rollers 79 are engaged by tracks as hereinafter set forth. Inner rollers 81 are engaged and guided vertically in oval slot 83. The faces of slot 83 take thrust loads on rollers 81 as plate 51 is drawn forward and eliminate thrust binding on pins 57, but at the same time permit plate 52 to change its vertical position relative to plate 51.

Figure 2:
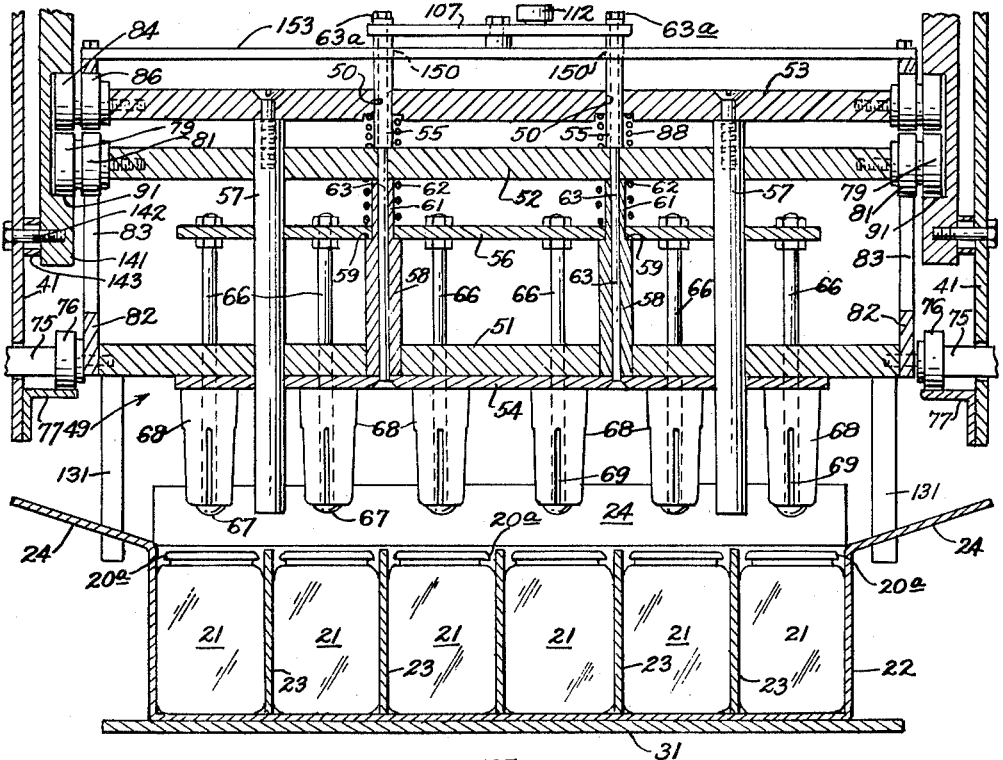
Fig. 2 is a transverse vertical section through one of the pallets, the pallet being in what is hereinafter referred to as "first position"
Figure 3:
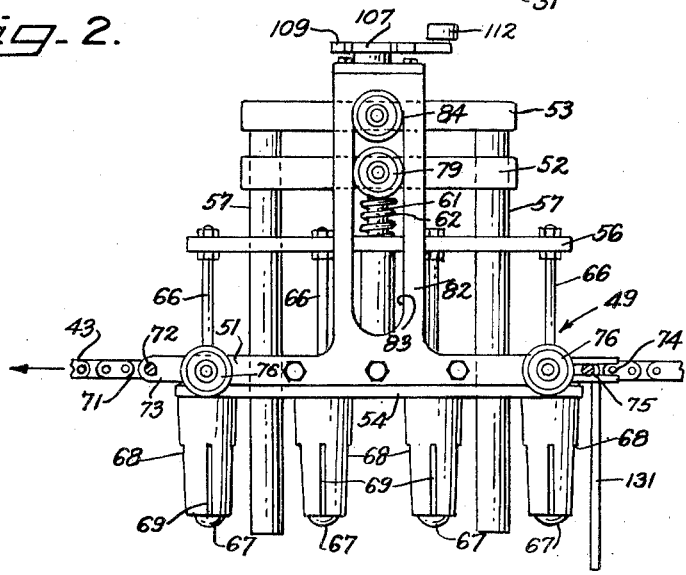
Fig. 3 is a side elevation in reduced scale of the structure of Fig. 2.

The plate 53 is also provided with an outer roller 84 and an inner roller 86 on each side of the machine. Inner rollers 86 are in vertical alignment with inner rollers 81 and are in contact with oval slot 83. Outer rollers 84 are guided by tracks during the cycle of operation of the machine, as hereinafter appears. Springs 88 on guides 55 act on plates 52 and 53 to separate said plates and prevent damage to the rollers 79, 81, 84 and 86 when, during the cycle of operation of the machine, the plates 52 and 53 are moved toward each other (Figs. 2, 6 and 7).

A track member 91 which is designed for engagement with the underside of roller 79 commences at a position approximately directly under the shaft 48 on the intake end of the machine. The distance between track 91 and track 77 is such that the plate 52 is held in the elevated position and the cups 68 are raised so that the pallet 49 is positioned relative to the case 22 in the first position shown in Fig. 2. Thus the pallet 49 is centered above the filled case 22. The track 92 slopes downwardly forwardly from the end of track 91 and thereby permits roller 79 and plate 52 to lower toward the second position shown in Fig. 4. Track element 93 engages the upper part of the roller 79 and forces the same downwardly into engagement with the track element 92. The tracks 92 and 93 are spaced apart a distance equal to the diameter of roller 79 to facilitate the downward forward movement of roller 79 as the chains 43 drag the pallet 49 forwardly. Track 94 is positioned horizontally parallel to the track 77 and its forward point 96 engages between the rollers 79 and 84 and separates the same so that the roller 84 proceeds horizontally to second and third positions shown in Figs. 4 and 5, respectively. Track element 97 extends horizontally and engages the top of roller 79 after the plate 52 has been lowered to the third position shown in Fig. 5. Track element 98 slants downwardly forwardly and cooperates with slanted track element 99 which bears against the opposite surface of roller 84 to lower the plate 53 to the fourth position shown in Fig. 6. Horizontally extending track element 101 connects with the lower edge of track element 99 and engages the top surface of roller 84 and forces the plate 53 downwardly. Upwardly slanted track element 102 permits upward movement of the plate 53, and also plate 52, until fifth position is reached. At the same time, track element 103 engages the underside of roller 79 and raises roller 79 and also roller 84 until the horizontal track element 104 is reached, which element terminates approximately under shaft 47.

The various track elements heretofore described comprise cams or trackways recessed into cam plates 141 secured to side frames 41 by means of bolts 142 with spacers 143 interposed. Cross-ties 144 extending transversely of the machine are bolted to cam plates 141 and side frames 41 to hold the same in parallel alignment and proper spacing.

Latch means is provided to latch tie bolt 63 in upward position relative to plate 51. For such purpose, the sleeves 55 are formed with grooves 106 adjacent the upper ends thereof. On top of the uppermost plate 153 is mounted a latch member 107 fastened to plate 153 by pivot 108 in such manner that the member 107 may oscillate about pivot 108 parallel to plate 153. Notches 109 are formed in the outer ends of the latch 107, the notches 109 fitting in the grooves 106 when the latch member is turned in the direction shown in the extreme righthand end of Fig. 9. In such position, the tie bolts 63 are held elevated, thereby restricting downward movement of cup-compressing plate 54 and the intermediate plates. The means whereby latch member 107 is shifted from the unlatched position shown on the lefthand side of Fig. 9 to the latched position shown on the righthand side comprises an integral extension 111 projecting rearwardly and carrying a roller 112 extending upwardly on its outer end. A first latch operator 113 is connected to one of the cross-overs 144 by bracket 114. The other end 116 of the first latch operator 113 is curved and as the pallet 49 moves along to a position approximately under the shaft 48, prior to which position the latch is in latched position, the roller 112 engages the end 116 of the latch operator 113 pushing the roller to one side and causing the latch member 107 to pivot around pivot 108 so that the notches 109 are disengaged from the grooves 106 in the sleeves 55. At the opposite end of the machine, approximately under the shaft 47, is a second latch operator 117 attached to one of the cross-overs 144 by second bracket 118. The curved end 119 of the second latch operator 117 engages the roller 112 and moves the latch 107 to latched position, in which position it remains until the pallet 49 has been carried completely around the machine on its upper stretch of travel and back to a location adjacent the first latch operator 113.

A modified construction whereby bottles 121 having narrow necks 122 which are too small for insertion of the cups 68 may be handled is shown in Fig. 10. A modified cup-compression plate 54a is employed, having a plurality of depending annular bosses 123 on its lower surface, of a diameter slightly greater than the diameter of neck 122. The support rods 66a carry on their lower end inverted rubber cups 124, the depending skirts 126 whereof are fringed. In the construction shown in Fig. 10, the skirts 126 of the inverted cups 124 surround the neck 122. As the annular bosses 123 are lowered, as plate 54a is lowered, the neck 122 is clamped inside the bosses 123, the resilient cup 124 preventing damage to the neck 122, yet providing a firm grip thereon.

Operation of the modification shown in Fig. 10 will be apparent to one skilled in the art by reason of the foregoing description.

In order to move the cases 22 into the machine, each pallet 49 is provided with a depending case-pushing finger 131 mounted on the rear of the plate 82, there being a finger 131 on each side of each pallet. The fingers 131 engage the rear edge of the side flaps 24 of each case 22 as the pallets 49 move up behind the cases 22 in the position shown on the left-hand end of Fig. 1. Thus the fingers 131 move the cases 22 off the intake conveyor 26 and unloading platform 31 until such time as the cups 68 are moved down inside the jars 21. A microswitch 132 is located approximately immediately below the shaft 48. Switch 132 is contacted and closed by one of the fingers 131 of each pallet 49 as it passes the switch 132 to close a circuit which energizes solenoid 133, which causes solenoid armature 134 to project, pushing the side of the waiting case 22 toward the center of the machine so that it is disengaged from stationary stop 136. Spring 137 retracts the armature 134 as soon as the solenoid 133 is deenergized so that the next case in order is retained in position by stop 136 until the preceding case has been moved into the machine.

In operation, the cases 22 are deposited on the table 26 with the flaps 24 open and with the jars 21 exposed with their mouths uppermost. Latch 107 is latched at the commencement of the cycle of operations. Microswitch 132 is closed when the preceding shipping case 22 has left the unloading platform 31. Accordingly, armature 134 pushes the case 22 out of engagement with case stop 136. Thereupon the case advances into the machine and fingers 131 push against the trailing edge of the side flaps 24, advancing the shipping case into the machine.

As pallet 49 passes around sprocket 46 and into position below shaft 48, rollers 76 engage track 77 and rollers 79 engage track 91; thus the load of the pallet is supported by the tracks. Thereupon as the pallet moves into the lower horizontal stretch of the machine, latch operator 113 engages roller 112 and unlatches latch 107.

Plate 51 extends through the working portion of the cycle in a straight horizontal path. At the start of the cycle, the rollers 79 engage track portion 91 which is spaced above track 77 a distance such that the cups 68 are in retracted position i. e., the plates 52 are elevated above the plates 51 a maximum distance. This position of the various parts of the pallet 49, which has heretofore been described, is hereinafter denominated the first position and is illustrated in Fig. 2. In first position, the cups 68, although they are elevated above the case 22, are so located that the cups 68 are centered relative to the jars 21 in the case 22.

Second position of the pallet 49, which is illustrated in Fig. 4, is accomplished by track 93 forcing the rollers 79 downwardly in cooperation with track element 92 in a gradual declination. This brings the stop plate 56 into contact with the upper surface of carrier plate 51. At the same time, rods 66, cups 68, and plate 54 have been lowered an equal distance. As illustrated in Fig. 4, the cups 68 have not yet been expanded.

By reason of points 96 entering between rollers 79 and 84, the rollers 84 are maintained in elevated position by horizontal track element 94 so that the plate 53 is elevated relative to the plate 51 the same distance in position two as in position one. In second position the cups 68 are lowered inside the jars 21, but the cups themselves are unexpanded.

Further movement of the pallet 49 to third position, which is illustrated in Fig. 5, causes further downward movement of rollers 79 toward engagement with rollers 76, this movement of the rollers 79 being guided by track elements 92 and 93. Because of the fact that stop plate 56 is in contact with the upper surface of plate 51, no further downward movement of rods 66 or heads 67 may occur. However, plate 54 is forced downwardly, against the compressive force of spring 62, until the maximum downward position of plate 52 is achieved. Inasmuch as heads 67 do not move between position two and position three, whereas plate 54 does move downwardly, the cups 68 are compressed. Because of the slots 69 therein, the cups 68 bulge outwardly and this causes the cups to grip against the inside of the jars 21. It will be seen that there is no contact between the plate 54 and the finish 20a of the jars 21, but that the sole engagement therewith is by means of the cups 68. When in third (and in fourth) position, the jars 21 cannot be dislodged from the cups 68.

In fourth position, shown in Fig. 6, the cooperative action of track elements 98 and 99 has lowered rollers 84 into close proximity to rollers 79. This movement causes plates 53 to lower to their lowermost position and thus lowers pins 57. Pins 57 are so located as to contact the dividers 23 in the shipping cases 22 and thus push the shipping cases downward away from the jars 21. Shipping cases 22 then drop onto conveyor 32 and are taken away from the machine.

Fifth position of the machine is shown in Fig. 7. In this position, cooperation of tracks 102 and 103 has elevated the rollers 84 and 79, thereby elevating plates 52 and 53. Elevation of plate 52 likewise elevates plate 54, and spring 62 tends to force plate 56 into engagement with shoulder 59 on spacers 58. The combination of these movements is to increase the distance between the heads 67 and the plates 54 so that the compression on the cups 68 is relaxed, permitting the cups to attain their unexpanded position. In fifth position, however, the cups 68 are still inside the jars 21, but the jars have been released and are now resting upon the conveyor 33.

Sixth position, which is substantially the same as that shown in Fig. 2, results in further raising of the roller 79 and plate 52 so that the cups 68 are raised above the jars 21 and the jars are thereupon released from pallet 49.

At the end of the lower horizontal stretch of travel, latch operator 117 contacts roller 112 and latches latch 107 while the load of the pallet is still carried by the trackways. Latch 107 maintains the pallet locked with plates 52, 53, 54 and 56 in retracted position while the pallet is carried up around sprocket 44, across the top stretch of travel and down around sprocket 46 to the commencement of the cycle of operations.

Although the foregoing invention has been described in some detail by way of illustration and example for purposes of clarity of understanding, it is understood that certain changes and modifications may be practiced within the spirit of the invention and scope of the appended claims.

What is claimed is:

1. Container handling apparatus comprising a pallet, said pallet having at least two parallel plates, a resilient, container-engaging member depending from said pallet, first means connected to one of said plates extending through said container-engaging member and secured to the end of said container-engaging member remote from said plates, second means connected to another of said plates and engaging the portion of said container-engaging member remote from the portion engaged by said first means, third means for moving said plates relative to each other to deform said resilient container-engaging member to grip and disengage a container positioned adjacent said container-engaging member, and fourth means for moving said pallet in a direction substantially transverse to the direction of movement of said plates, said third means being actuated by movement of said pallet.

2. Apparatus according to claim 1 in which said container-engaging member in relaxed position is dimensioned to extend into the mouth of the container and in deformed position to expand to grip the inside of the container.

3. Apparatus according to claim 1 in which said container-engaging member comprises an inverted cup dimensioned to fit over the top of the neck of a container, and in which said second means comprises an inverted annular member having a slightly larger diameter than said neck and surrounding said cup whereby as said second means is moved downwardly said neck is engaged by compression of said cup between said neck and said annular member.

4. Container handling apparatus comprising a carrier plate, means for advancing said carrier plate, a stop plate above said carrier plate, a cup-compressing plate below said carrier plate, at least one resilient cup below said cup-compressing plate dimensioned when in contracted position to fit within the mouth of a container, means rigidly connecting the lower end of said cup and said stop plate, and means for lowering said cup-compressing plate relative to said stop plate to expand said cup to grip the inside of said container.

5. Apparatus according to claim 4 which further comprises a cup-elevating plate above said stop plate and a spacer interposed between said cup-elevating plate and said cup-compressing plate to maintain the distance therebetween constant, the amplitude of movement of said cup-elevating plate relative to said carrier plate being greater than that of said stop plate relative to said carrier plate, whereby said cup is first lowered into a container by downward movement of said cup-elevating plate and then compressed to grip said container by further downward movement of said cup-compressing plate.

6. Apparatus according to claim 5 which further comprises spring means biasing said cup-elevating plate and stop plate apart.

7. Apparatus according to claim 4 in which said cup comprises a hollow member having an open mouth at the top engaging the underside of said cup-compressing plate and having a plurality of longitudinal slits terminating intermediate the ends thereof.

8. Apparatus according to claim 5 which further comprises a case stripping plate and a plurality of stripping pins depending from said case stripping plate arranged to contact and move downwardly the partition of a case surrounding said container upon downward movement of said case stripping plate.

9. Apparatus according to claim 5 which further comprises first rollers on said carrier plate, second rollers on said cup-elevating plate, means for advancing said carrier plate and cup elevating plates together, and stationary trackways engaging said rollers, said trackways varying in elevation to vary the elevation of said carrier and cup-elevating plates relative to each other.

10. Apparatus according to claim 8 which further comprises first rollers on said carrier plate, second rollers on said cup-elevating plate, means for advancing said carrier plate and cup-elevating plates together, third rollers on said case-stripping plate and a plurality of stationary trackways varying in elevation and engaging said rollers to vary the elevation of said carrier, cup-elevating and case-stripping plates relative to each other.

11. Apparatus according to claim 10 which further comprises means carried by said carrier plate and contacting said cup-elevating and case-stripping plates to transmit forward movement of said carrier plate to said cup-elevating and case-stripping plates.

12. Apparatus according to claim 11 in which said last-named means comprises a thrust guide extending substantially perpendicular to said carrier plate and in which said cup-elevating and case-stripping plates are each provided with a roller engaged by said thrust guide.

13. Apparatus according to claim 8 which further comprises tie bolts fixed to said cup compression plates of a length to extend above the elevation of said case-stripping plates when said cup-compression plate is in uppermost position, first latch means carried by said tie bolts, second latch means carried by said carrier plate and stationary latch operator means operable to move said first and second latch means into and out of engagement as said carrier plate is advanced past said latch operator means.

14. A machine for unloading a plurality of containers from shipping cases comprising a frame, a pair of continuous chains on opposite sides of said frame, means for driving said chains at equal speeds along a course having an elongated lower stretch, a filled case unloading station at one end of said lower stretch, a container depositing station at the opposite end of said lower stretch, an empty case depositing station intermediate said filled case and container depositing stations, a pallet extending transversely of said machine and driven by said chains, said pallet comprising a plurality of parallel and relatively movable plates, trackways mounted on said frame adjacent said lower stretch and engageable with some of said plates to elevate and depress some of said plates, a plurality of resilient cups depending from the lowermost plate corresponding in number and position to the containers in said shipping case, means connecting one of said plates to the bottom of each said cup and another of said plates to the top of each said cup, said trackways being located and elevated to lower said cups into said containers at said unloading station, then lower one said plate relative to another to expand said cups to squeeze the insides of said containers and grip said containers, and subsequently to raise said one plate relative to said other plate to contract said cups to release said containers at said container depositing station.

15. A machine according to claim 14 which further comprises a case-stripping plate on said pallet engageable with one of said trackways, and a plurality of stripping pins depending from said case-stripping plate, said trackways being located and elevated to depress said case-stripping plate over said empty case depositing station to strip said case off the containers contained therein while said containers are gripped by said cups.

16. A machine according to claim 14 in which is further provided a pair of laterally spaced pusher fingers on the rear of said pallet arranged to push the diverging open side flaps of said shipping case.

17. A machine according to claim 14 which further comprises latch means operable to latch said plates together and switch means on said frame co-operable with said latch means to unlatch said plates after said pallet is engaged by said trackways at the beginning of said lower stretch and to latch said plates before said pallet is disengaged from said trackways at the end of said lower stretch.

18. An apparatus for handling hollow objects, comprising a pallet, said pallet having at least two parallel plates, an object-engaging resilient cup depending from said pallet, means connecting one of said plates to the bottom of said cup and the other of said plates to the top of said cup, means for moving said plates relative to each other to expand or contract said cup to engage and disengage an object inside which said cup is positioned, and means for moving said pallet in a direction substantially transverse to the direction of movement of said plates, said means for moving said plates being actuated by movement of said pallet by said means for moving said pallet.

References Cited in the file of this patent

UNITED STATES PATENTS

| | | |
|---|---|---|
| 1,835,485 | Freeman | Dec. 8, 1931 |
| 2,198,068 | Wadsworth | Apr. 23, 1940 |
| 2,626,811 | Hohwart et al. | Jan. 27, 1953 |
| 2,707,572 | Rothman | May 3, 1955 |